(12) United States Patent
Riley

(10) Patent No.: US 9,043,874 B2
(45) Date of Patent: May 26, 2015

(54) SYSTEM AND METHOD FOR PROTECTING DATA IN AN ENTERPRISE ENVIRONMENT

(71) Applicant: Wal-Mart Stores, Inc., Bentonville, AR (US)

(72) Inventor: Stuart I. Riley, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 142 days.

(21) Appl. No.: 13/687,550

(22) Filed: Nov. 28, 2012

(65) Prior Publication Data

US 2014/0150060 A1 May 29, 2014

(51) Int. Cl.
*G06F 15/16* (2006.01)
*H04L 29/06* (2006.01)

(52) U.S. Cl.
CPC ............ *H04L 63/0428* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 5,361,359 | A * | 11/1994 | Tajalli et al. | 726/23 |
| 8,281,141 | B2 | 10/2012 | Dill et al. | |
| 2006/0129691 | A1 | 6/2006 | Coffee et al. | |
| 2009/0175279 | A1 * | 7/2009 | Gao et al. | 370/395.21 |
| 2009/0217355 | A1 * | 8/2009 | Smith | 726/3 |
| 2010/0268933 | A1 * | 10/2010 | Frattura et al. | 713/151 |
| 2010/0306262 | A1 * | 12/2010 | Kuo et al. | 707/776 |
| 2011/0145593 | A1 | 6/2011 | Auradkar et al. | |
| 2014/0086255 | A1 * | 3/2014 | Gooch et al. | 370/401 |

OTHER PUBLICATIONS

National Institute of Standards and Technology, "Recommended Security Controls for Federal Information Systems and Organizations", NIST Special Publication 800-53 Revision 3, Aug. 2009, Gaithersburg, Maryland; 237 pages.
International Search Report & Written Opinion in counterpart international patent application No. PCT/US13/71390, mailed on May 8, 2014; 8 pages.

* cited by examiner

*Primary Examiner* — Nirav B Patel
*Assistant Examiner* — Mohammed Waliullah
(74) *Attorney, Agent, or Firm* — Schmeiser, Olsen & Watts LLP

(57) ABSTRACT

Provided are a system and method for protecting data in an electronic communications environment. An interested entity establishes one or more controls for a received unit of data. At a source device in the electronic communications network, the unit of data is encapsulated with self-protection security data that includes the one or more controls. The encapsulated unit of data is delivered from the source device to a destination device in the electronic communications network. A data broker facilitates the delivery of the data to the destination device according to the controls. Facilitating the delivery of the data includes: identifying for the receiving device a collection of services corresponding to the controls independently of the network.

17 Claims, 8 Drawing Sheets

| RBAC Rules 202 | Ownership 204 | Classification 206 | Modify Rules 208 | Data 210 | Data EOL 212 |

SYSTEM AND METHOD FOR PROTECTING DATA IN AN ENTERPRISE ENVIRONMENT

FIELD OF THE INVENTION

Embodiments of the present inventive concepts relate to data protection, and more particularly to systems and methods for data self-protection in an enterprise environment.

BACKGROUND

Electronic communications typically include the transfer of data between user computers, servers, network switches and routers, and data storage devices. Security-related challenges continue to face computer users and network administrators alike as the growth of data continues to require the availability of storage space and the protection and control of both stored data and data in transit.

SUMMARY

In accordance with one aspect, provided is a method for protecting data in an electronic communications environment. An interested entity establishes one or more controls for a received unit of data. At a source device in the electronic communications network, the unit of data is encapsulated with self-protection security data that includes the one or more controls. The encapsulated unit of data is delivered from the source device to a destination device in the electronic communications network. A data broker facilitates the delivery of the data to the destination device according to the controls. Facilitating the delivery of the data includes: identifying for the receiving device a collection of services corresponding to the controls independently of the network.

In accordance with another aspect, provided is a data protection system, comprising: a data packet generator that encapsulates a unit of data with a set of data self-protection data that includes one or more controls and a data broker that facilitates the delivery of the data to a destination device in a network according to the controls, which includes identifying for the receiving device a collection of services corresponding to the controls independently of the network.

In accordance with another aspect, provided is a computer program product for protecting data in an electronic communications environment, the computer program product comprising: a computer readable storage medium having computer readable program code embodied therewith. The computer readable program code comprises computer readable program code configured to establish one or more controls for a received unit of data; computer readable program code configured to encapsulate the unit of data with self-protection security data that includes the one or more controls; computer readable program code configured to deliver the encapsulated unit of data from the source device to a destination device in the electronic communications network; and computer readable program code configured to facilitate the delivery of the data to the destination device according to the controls, including identifying for the receiving device a collection of services corresponding to the controls independently of the network.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 4 is a diagram illustrating contents of a data security pattern, in accordance with an embodiment;

DETAILED DESCRIPTION OF THE EMBODIMENTS

Figure 1:
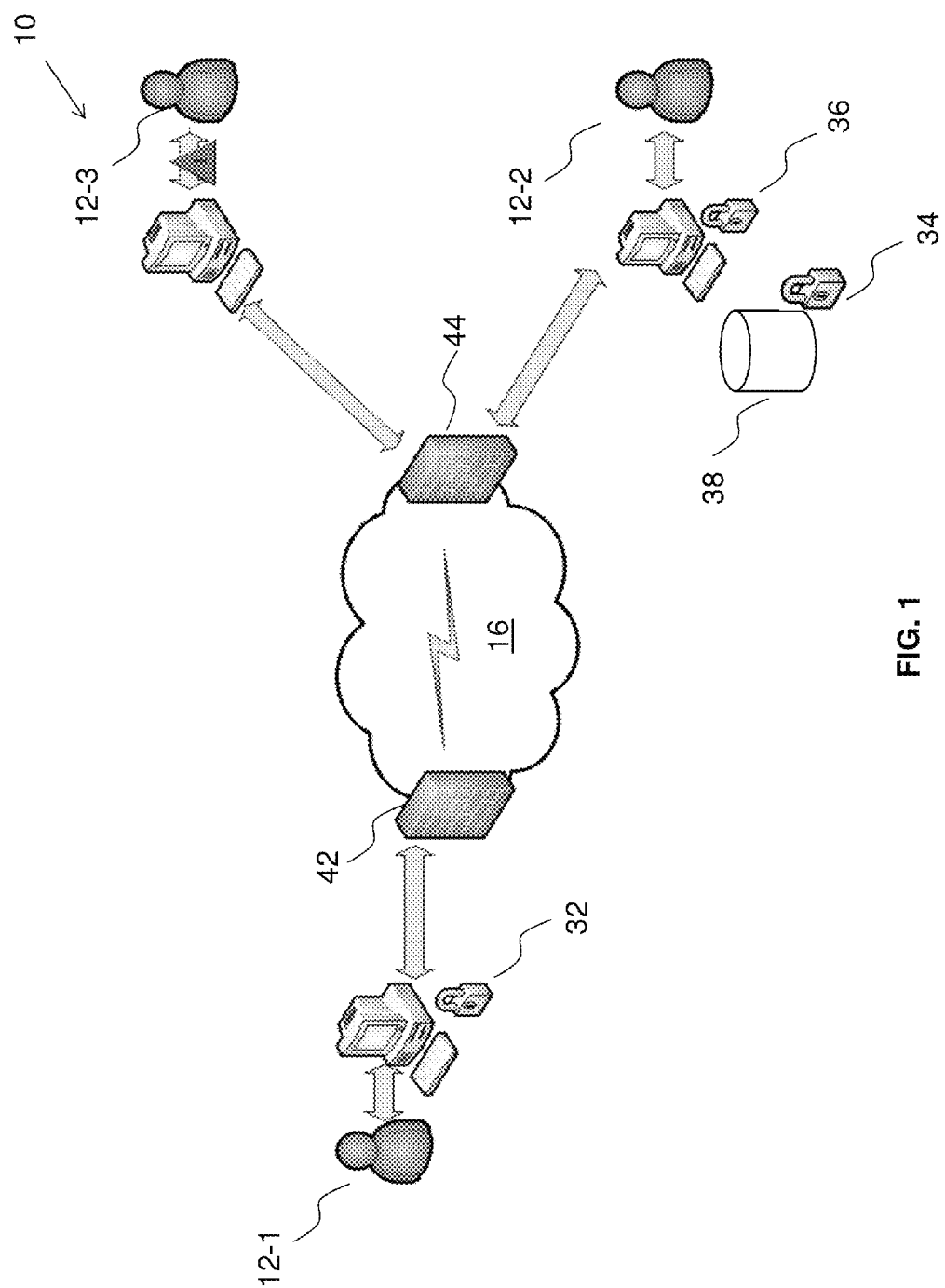
FIG. 1 is a block diagram illustrating a data exchange in a secure network environment, in accordance with an embodiment.

In the following description, specific details are set forth although it should be appreciated by one of ordinary skill that the systems and methods can be practiced without at least some of the details. In some instances, known features or processes are not described in detail so as not to obscure the present invention.

Data can be retrieved from queries of databases or other storage devices, and/or generated by systems or persons of authority. However, some data can potentially contain sensitive information, at any time, and may offer risks to the owner or other party entrusted with the data should the data be copied, lost, destroyed, corrupted or manipulated. Data can have different levels of importance to a user. Some data can be deemed by a business or user to be privileged or sensitive, while other data is less important. Data can also have varying life cycles. For example, some data such as news articles can become less important over time. Other data can have longer lifecycles, but is nevertheless rendered obsolete after remaining stored at a database or the like after a predetermined period of time, for example, tax records stored at a government data storage location. Some data is transitory while other data may serve as a figure of authority or fact, thereby having a longer useful purpose. Other data characteristics can relate to the manner in which data is processed, for example, by whom, when, and/or where, and how the data is exposed, either during transmission between a source and destination computer, or when stored at a database or other storage device.

Several approaches are available for addressing security threats related to data protection. One conventional approach includes the use of firewall devices, intrusion detection and prevention systems (IDS/IPS), or related external security or protection devices in a network. Firewall devices are well-known for inspecting network traffic by executing decisions based on predetermined configurations or rules, for example, in accordance with an organization's security policies. However, costs associated with implementing additional firewalls as a network scales can be prohibitive. A related issue is that network administration complexities can arise when many devices are implemented, which can reduce the effectiveness of firewalls with respect to protecting data.

IDS devices can be implemented to inspect network traffic and trigger alarms based on preconfigured policies or rules. IPS devices can enforce such policies and rules by blocking network traffic. However, IDS/IPS devices can suffer similar limitations as those associated with firewalls with respect to high costs and effectiveness, especially as a network grows. Other costs can be incurred in cases where an attack is not well-known to the IDS/IPS, where a human operator may be required to make decisions on responding to the attack.

Other approaches include encryption and tokenization of data. Encryption techniques require processor-intensive computations, especially when applied to large quantities of data, which can cause performance issues. Tokenization allows "sensitive" data masked with non-sensitive data, but mimics the attributes and form of the original data. For example, social security numbers have the form of 123-456-7890, where each group is defining a geographic region, an issuance number, and reflects whether the issuing agency is state or federal government. A token will be in the same form using yyy-yyy-yyyy, where the numbers and fields look real, but cannot be validated against a real database of social security numbers at the registry. A similar technique can performed to mask credit card numbers and bank cards. However, the desensitization of fields requires replacement characters to be generated using business rules built into algorithmic processes, allowing public storage of the data that do not require encryption. For example, the importance of tokenization for payment card industry (PCI) data relies on the removing of sensitive card data with non-meaningful numbers that take it out of the scope of PCI protection.

FIG. 1 is a block diagram illustrating a data exchange in a secure network environment 10, in accordance with an embodiment. The environment 10 can include two or more computer users who exchange data with each other via their computers 12-1, 12-2, 12-3 (generally, 12) and a network 16, for example, a public switched telephone network (PSTN), a mobile communications network, a data network, such as a local area network (LAN) or wide area network (WAN), or a combination thereof, or other communication networks known to those of ordinary skill in the art.

Figure 3:
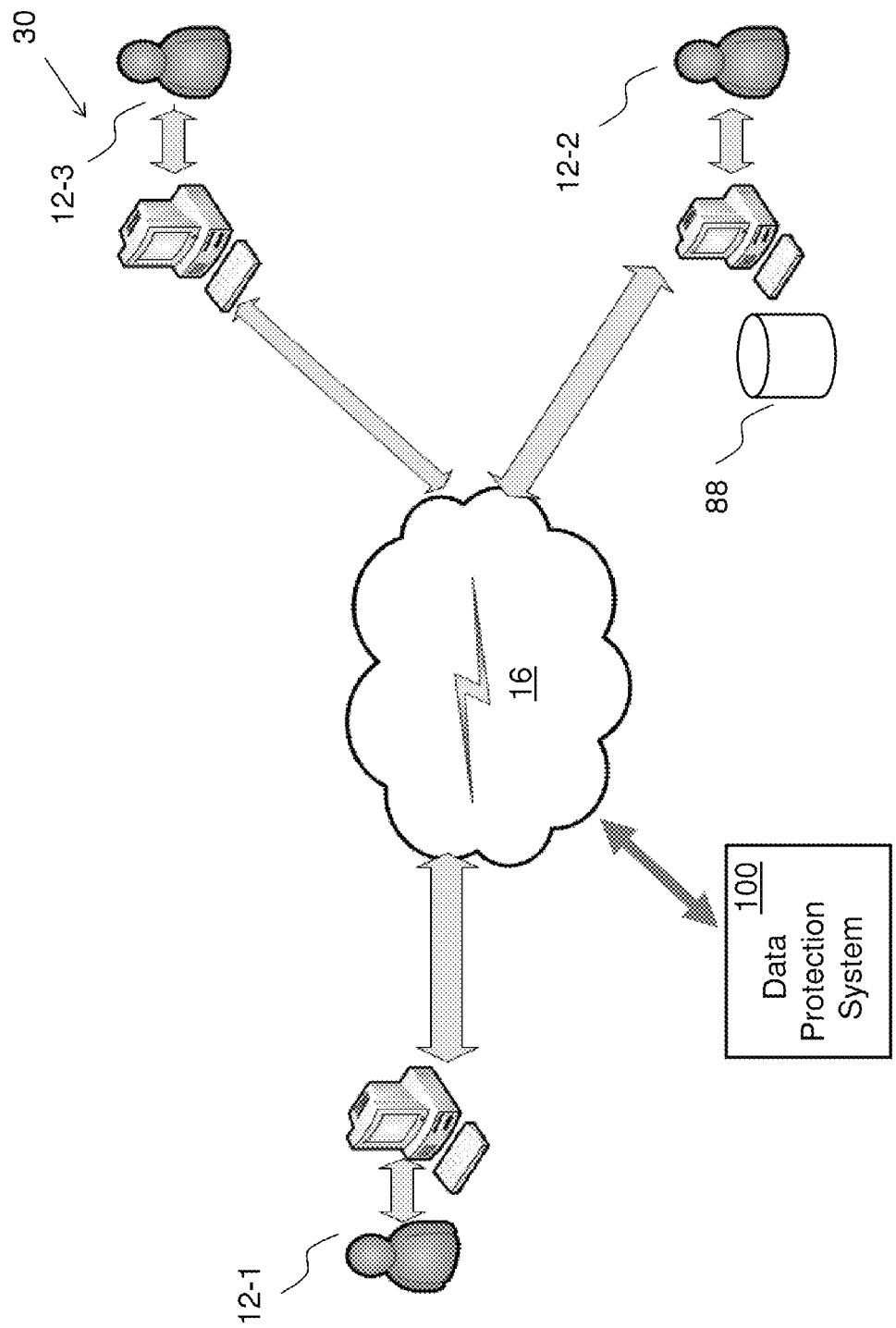
FIG. 3 is a block diagram of an environment illustrating a self-protecting data flow, in accordance with an embodiment.

One or more protection devices 42, 44, also referred to as security devices, such as firewalls, IDS/IPS devices, and/or encryption/decryption mechanisms 32, 34, 36, can be implemented in the environment 10 to provide one or more forms of security known to those of ordinary skill in the art, which can complement or be augmented by embodiments of the present inventive concepts. In other embodiments, as shown in FIG. 3, the systems and methods described herein are applied to obviate the need for some or all of the protection devices 32, 34, 36, 42, 44.

A user at a first computer 12-1 can create documents, electronic messages, or other electronic data for exchange with the users at second and third computers 12-2, 12-3, respectively. Encryption devices 32, 36 at first and second user computers 12-1, 12-2, respectively, can encrypt and/or decrypt the data, for example, with a public or private key. A self-protecting document can be created at a user computer, for example, a first computer 12-1. The data can be unstructured or structured, for example, suitable for a relational database. The data can include any information in electronic form that is subject to distribution or transfer, including but not limited to documents, messages such as email, text messages, images, audio, video, and/or multimedia.

In an embodiment, the self-protecting document is transmitted over a communication path over the network 16 to one or more different destinations. In embodiments, where the data is encrypted, requires a token, or is subjected to related security techniques, the data can be decrypted or the like at a decryption mechanism 36 in communication with the second user computer 12-2 or a decryption mechanism 34 in communication with the storage device 38, where the data can be stored in an encrypted state. As shown in FIG. 1, a third computer 12-3 does not have an decryption mechanism for decrypting an encrypted data packet received from the first user 12-1 or the second user 12-2, even though the third computer 12-3 may receive the encrypted data as part of a distribution list. Alternatively, the data may not be received at the third computer 12-3 due to filtering or the like.

A feature of the present inventive concepts is that a unit of data that is self-protected is not displayed and can provide a level of security that complements or replaces other data security types. Here, clear text or the like can be provided that masks or otherwise protects the actual data payload, which presents clear text that is irrelevant with respect to the actual data being protected. Accordingly, the self-protected data can be transmitted to other destinations, whereby only intended recipients can reverse the process to read the protected information. Unintended recipients, on the other hand, for example, a recipient who receives a unit of data but is unauthorized to access it, may instead receive a message saying that the data is not available, even if the data is sent to the unauthorized party. The self-protected data in this example can prevent the data from being displayed to the unauthorized recipient. The data can also, or alternatively, be stored at a storage device such as a database in a protected state according to a set of self-protection controls provided with the unit of data. For example, the data may be deemed obsolete even though it is stored. Accordingly, the self-protection controls can provide a flag or trigger for a search or analysis tool to identify the obsolete data, and to take action according to the end-of-life control provided with the unit of data, for example, purging the obsolete data from the database.

Figure 2:
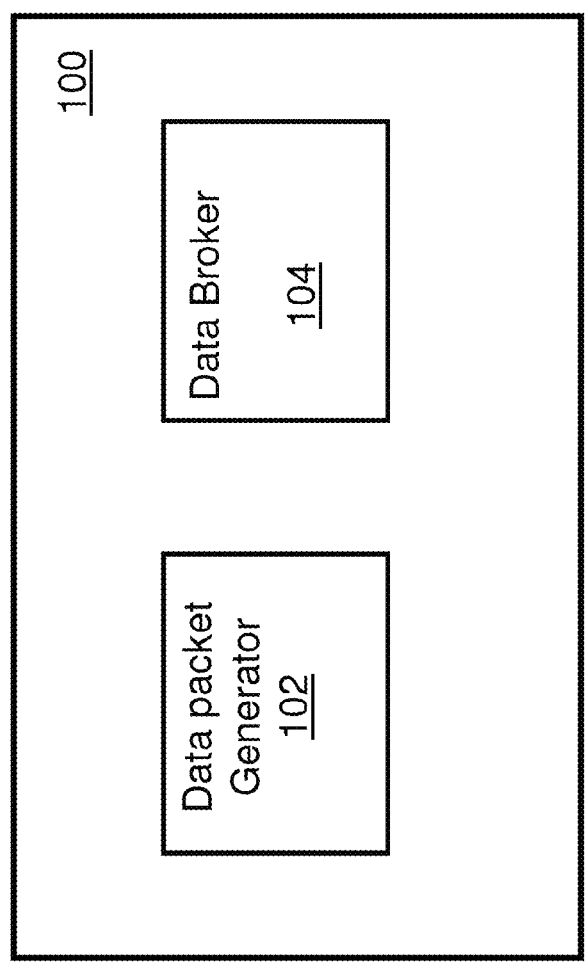
FIG. 2 is a block diagram of a data protection system, in accordance with an embodiment.

FIG. 2 is a block diagram of a data protection system 100, in accordance with an embodiment. The data protection system 100 can be implemented at the environment 10 illustrated at FIG. 1, and provide self-protected data in the presence of firewalls and/or other network security devices. Alternatively, the data protection system 100 can be implemented at the environment 30 illustrated at FIG. 3, which does not include the presence of some or all network security devices. Accordingly, the data protection system 100 provides data self-protection features while permitting data to be transmitted with self-protection controls to be transmitted across enterprise networks with or without external protection devices.

The data protection system 100 includes a data packet generator 102 and a data broker 104. The data packet generator 102 and the data broker 104 can coexist under a same computer platform, or at different computer platforms.

The data packet generator 102 generates a security pattern having a set of data self-protection controls, referred to as self-protection security data, and encapsulates a data payload to be transmitted across a network 16 with the generated self-protection security data. In an embodiment, the data packet generator 102 places controls around the data so that the data is self-protecting. In doing so, the controls provide access limits to the data, for example, correct identification, classifications with respect to use of the data, and a level of criticality of the data. The self-protected security data can be appended to the data payload as part of a packet, frame, cell, or other unit of data for establishing who can access the data payload, where the data payload can be accessed, and for providing other features for permitting the data to protect itself, obviating the need for external firewalls, encryption devices or servers, or the like. The self-protection security data can include an end of life (EOL) field indicating when the data is obsolete, for example, with respect to the business associated with the data. Other controls placed around the data can include controls for placing the data in the network, receipt by endpoints, and/or user controls. For example, Health Insurance Portability and Accountability Act (HIPAA) regulations permit data to be allowed between a caregiver and patient, but does not restrict other facets dealing with medical billing or patient care planning. Other security-related factors as to a destination of the data, viewers of the data, and processing of the data, for example, how it should be handled, where it goes, who will view it, or see it in reports, or how it should be handled are redefined by the data and then data routing, data handling, and data observance can be passed to the data broker 104 for processing. Referring again to the previous example, the "owner" of the data can be a physician sending medical prescriptions in the form of electronic data to a pharmacy. The physician as the sender, or the hospital employing the physician, can implement rules via the controls that only the pharmacy can decode HIPAA data or its classification, and that others are prohibited from modifying the prescription. Another control can establish that the data, i.e., a message including the prescription, is good for the length of time required by law, as a medical record.

The data broker 104 facilitates the delivery of the data to the destination device according to the self-protection security data. The data broker 104 can identify for the receiving device a collection of services corresponding to the controls independently of the network. The data broker 104 can build a package of controls, destination information, encryption and/or tokenization information, or a combination thereof from local services executing on a local computer in communication with the network 16.

The data broker 104 can communicate with existing applications at the application layer and those mechanisms that perform a data transfer to existing storage or networks. The data broker 104 allows the application layer to operate independently of the protections on data and their associated storage. For example, data storage may have the capability to break up information into data blocks, but the data as protected will be transmitted to the store either in protected form (non-human readable) or in clear text as defined by the originator. Data that is encrypted can be provided to the appropriate application, which in turn can request an enterprise service bus (described below) to decrypt the package to request that storage mechanisms independently store the data in a protected storage format. Data can be routed from the data broker 104 to a system that includes a storage unit or to a display or other I/O device, depending on the type of service targeted by the broker. A receiver, for example, an application at a user computer, can decode or interpret the package or controls for security to exchange with the enterprise service bus and application one or more items including but not limited to an intended recipient or application, classification levels for handling or dissemination, and details on how the data is to be retained. For example, a physician sending a prescriptive remedy to a pharmacy may want the prescription to be stored securely, which requires the enterprise service bus (described below) to decode for the application storage security controls. While in the same encoded controls, the enterprise service bus may also allow specific intended recipients, e.g., a pharmacy, to view and fulfill the prescribe remedy. Data intended for storage can be directed by the broker 104 from a receiving service related to the enterprise service bus. The broker 104 can decode the intended application or service to deliver the data. For example, the controls can define "how" the information shall be handled and to where it is allowed to be sent. However, the enterprise service bus can route the data to applications or services that can, for example, process an order, display information, or request storage and type of storage for the information data transmitted. The receiver services and applications can then process the service requests sent by the enterprise service bus as part of the broker 104 for the originator or user system.

In doing so, the data broker 104 can reside at the user computers, e.g., 12-1, for encoding and/or decoding messages or packages of data. When outputting a data message, the data broker 104 can form the data payload, e.g., messages and so on, into a message that is configured for transmission. When receiving a self-protecting message, the data broker 104 can process the message according to predetermine rules, for example, allowing access or readability to users identified by the sender or other data owner. In embodiments where the receiving computer, e.g., 12-1 is an intended recipient, the data broker 104 at the receiving computer 12-1 can decode and/or decrypt the received data into human readable format information. For example, a physician sending medical records to another office may not be any physician, but instead may be identified as a specific physician allowed to read the message because the broker 140 according to the role-based access field 202 described below. In this example, the intended recipient, i.e., computer 12-1, is allowed to process the received data in this manner because it is established to be the physician's computer, and authorized to read HIPAA data controlled information.

FIG. 4 is a diagram illustrating contents of a data security pattern 200, in accordance with an embodiment. The data security pattern 200 provides self-protection controls for a data payload 210 transmitted over a network, for example, shown in FIGS. 1 and 3.

The data security pattern 200 includes a role-based access (RBAC) field 202, an ownership field 204, a classification field 206, a modify rules field 208, a data payload field 210 and an end of life (EOL) field 212.

The contents of the security pattern 200 can be controlled by the data owner and/or the business actors, who can use or otherwise benefit from the data. One or both of these actors can define the security controls and business rules of conduct of control of the data and its attributes. In an embodiment, the data owner also referred to as a security actor, or other party authorized to define the security controls, can provide protections for data at rest, in transport, or authenticate an owner, recipient, user, or other party having interest in the data. The security actor can provide information having protection guarantees, for example, identifying who can read the dataset, where it can be sent or received, how to decrypt it, and how long the message should be kept.

In an embodiment, the business entity, also referred to as a business security actor, defines aspects of the data not normally specified by security, for example, sets a life-cycle or a period when the data is considered aged, or no longer worth retaining, or other retention policy, as well as the useful life of the intended business use. For example, the business entity can ensure that attributes of the unit of data comply with the business rules of conduct in the electronic communications network, for example, establishing the useful life of a unit of data.

The contents of the RBAC field 202 can control access to computer or network operating systems and software, for example, the storage devices 38, 88 shown in FIGS. 1 and 3, respectively, according to who can read, write, modify, the data, and/or where, when, and what is allowed to access the data. In doing so, an individual user can be empowered to perform a specific task, such as view, create, or modify a file.

The security actor can grant access via the data protection system 100 based on the roles one or more users have within the organization, for example, computer users 12 in the enterprise environments 10 of FIG. 1. Roles can be defined according to job competency, authority, and responsibility within the enterprise. For example, in the health industry, there are many different actors, each with different roles, e.g. doctors, nurses, lab technicians, and so on, with varying levels of access to a patient's health records. The security actor can assign individual users into roles, which identifies the users as members of a specific group, based on their capabilities, work requirements, and responsibilities in the organization. Access rights, or security privileges, are then established for each role. A user may belong to multiple roles, which provide the appropriate level of access for their requirements, for example, a doctor may be involved with patient billing. Thus, the RBAC structure empowers the security actor with a tool to add, change or delete users having access to the data 210 and to regulate which users are given access to certain data or resources, without having to explicitly authorize each user to each resource.

The contents of the ownership field 204 include a value corresponding to an owner of the data contents, for example, as determined by the entity initiating the transfer of the data. For example, computer user 12-1 can be established as the owner of the self-protecting document referred to in FIG. 1.

The contents of the classification field 206 include a classification type related to the use and criticality of the data. Examples can include but not be limited to private, confidential, and unprotected classification types.

The modify rules field 208 includes data indicating what is allowable and what is noted. The modify rules data can define who can alter a message, for example, it is like the intended recipient replying to an electronic mail message is allowed, while someone who might capture the message illegally cannot modify the record. For example, the security actor can change rules as they exist in the database 38, and/or create new rules in the database 38, for example, override a severity setting. Accordingly, a rule can be generated establishing that messages or other data sent to specific intended audiences can be modified only by those intended audience recipients, for example, only the recipients can reply to the received message. This example rule can also establish that any user at a social site can reply back or change the information because it is "open" to all to see, read, and modify.

The data payload field 210 includes a data payload, for example, chunk data or tokenized data. The data can be encrypted and/or tokenized, and include additional data such as certificate key identifiers or the like. Thus, in environments where the data is sent to an unauthorized recipient, the data is not displayed or otherwise processed at the recipient's computer in accordance with the self-protection controls. Here, the data is encrypted and/or tokenized, providing another form of security.

The EOL field 212 includes a designator for when or how the data of the security pattern 200 is to be expunged or destroyed based on a predetermined retention policy.

Figure 5:
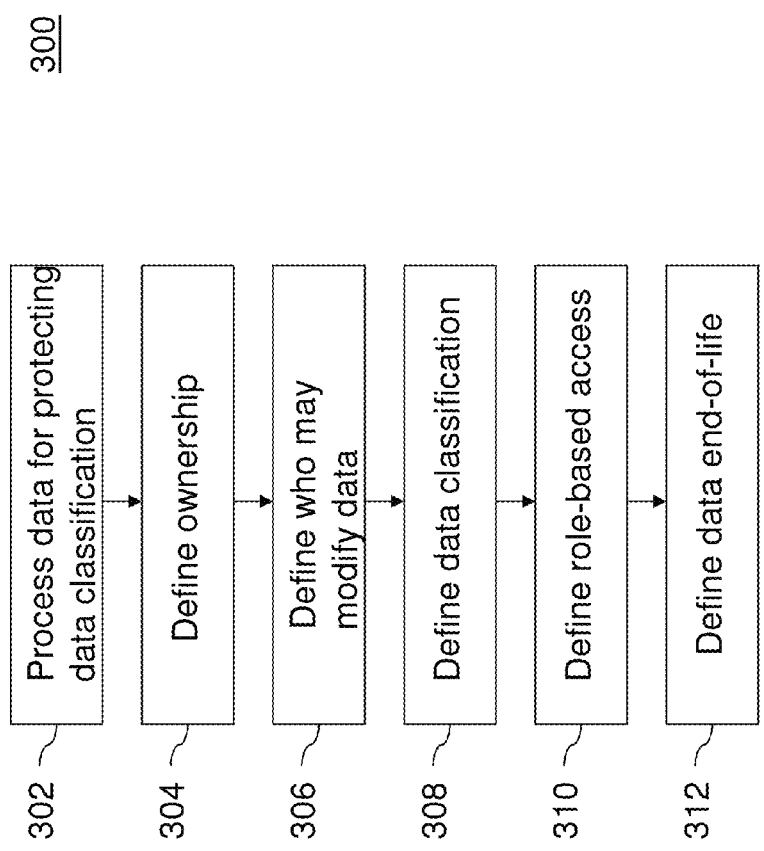
FIG. 5 is a method for data encoding, in accordance with an embodiment.
Figure 6:
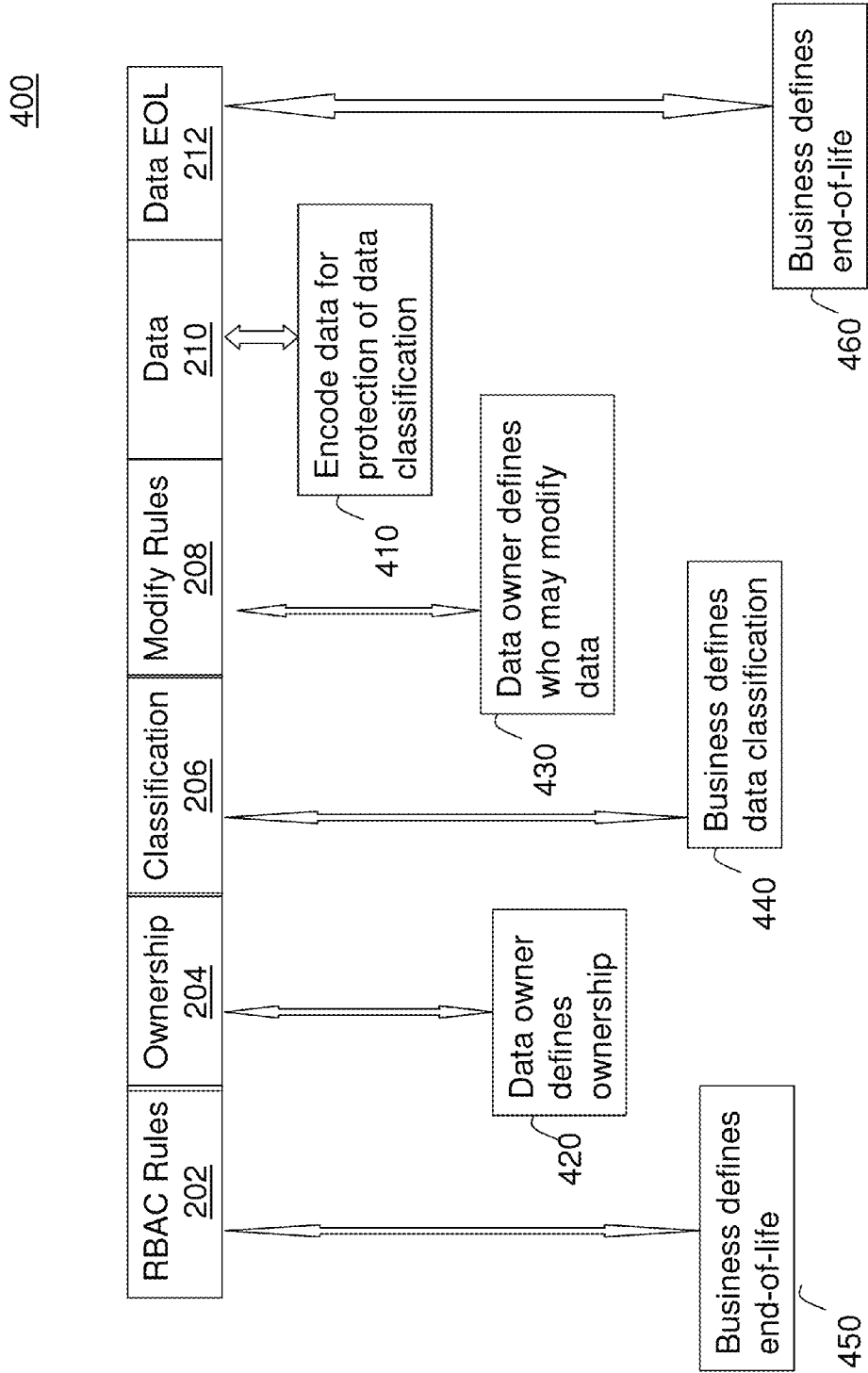
FIG. 6 is flow diagram illustrating a data encoding process, in accordance with an embodiment.

FIG. 5 is a method 300 for data encoding, in accordance with an embodiment. FIG. 6 is a flow diagram illustrating a data encoding process 400, in accordance with an embodiment. In describing the method 300 and data encoding process 400, reference is made to the security pattern 200 of FIG. 4. The method 300 includes a logical flow on how the self-protection security data referred to in FIG. 4 can encapsulate the data chunk 210, and requirements for completing the steps. In performing the method 300 for data encoding, At block 302, the data 210 is processed for protecting the data classification. The data can be encoded, encrypted, tokenized, or subjected to related techniques known to those of ordinary skill in the art. For example, as shown at method step 410 of FIG. 6, data can be encoded 410 for protecting a data classification. For example, HIPPA data can be encrypted due to predetermined regulations regarding health record confidentiality, while in yet another situation, PCI data may be tokenized or subjected to data substitution rather than encrypted, whereby only the card data is non-human readable but the other information is readable.

At block 304, the data owner defines the ownership of the data, for example, as shown at method step 420 of FIG. 6. The data defining ownership, for example, defining who can receive the data and/or where the data can be provided, is entered at the ownership field 204. Ownership of the data can be configured by default as a business entity owning the data, or other stewards of the data. Data ownership is independent of where data storage, capture, or transmission occurs. Rather, data ownership possesses controls with respect to how security and data handling are to be applied. An example of ownership is the issuing entity, for example, the "sender" of an email message. The email in this example is owned by the knowledge holder, who is typically but not necessarily the sender. The owner can determine who may have access to the message contents and to what degree the readership is allowed, for example, permission to alter contents of a word processing file. Non-owners or non-issuers can be provided with different access rights, for example, prohibited from reading or parsing the message, but permitted to read, modify, and/or delete the message.

At block 306, the data owner defines who may modify the data, for example, a person, organization, or other entity. As shown in method step 430 of FIG. 6, data corresponding to who may modify the data is provided at the modify rules field 208.

At block 308, the business actor defines the data classification, for example, shown at method step 440 of FIG. 6. A data classification can declare an amount of sensitivity of a document, package or message or a unit of information. For example, the U.S. government can issue public documents that are readable by everyone, while the U.S. Department of Defense (DoD) transmits sensitive "secret" messages that are only sent to a selected readership. This data is provided at the classification field 206.

At block 310, the data owner defines the role-based access, for example, who can access the data. As shown at method step 450 of FIG. 6, this data is provided at the RBAC rules field 202.

At block 312, the business actor defines the data end-of-life. As shown at method step 450 of FIG. 6, this data is provided at the data EOL field 212. The business actor is responsible for determining the useful life of the data 210 based on requirements for retention, legal hold stipulations, and regulatory mandates. For example, longevity of a message is determined by the owner (sender), by directives or regulation, or by business function, or intended use. For example, the sender may want this message to expire after being read by the recipient because of reasons of sensitivity or not wanting it shared in any form.

As described herein, a set of security controls can be provided for a data security pattern, in accordance with an embodiment. In an embodiment, the security controls are defined and controlled by the security actor, which controls the protection of data at rest, in transport, or as a means to authenticate an owner of the dataset. The security controls can be defined according to, but not limited to, the Open Security Architecture organizations defined categories based on the National Institute of Standards and Technology (NIST) for security management under NIST Special Publication SP800-53 documented guidelines, incorporated herein by reference in their entirety. Other security controls can equally apply. The security controls defined and controlled by a security actor can include access control policies and procedures, which establish who can access the data. Another security control can include information flow enforcement controls, which regulate where data is allowed to travel within an information system, or between systems. Another security control can include an identification and authentication control, which identifies and authenticates organizational users, or processes acting on behalf of organizational users. Another security control can include an access enforcement control, which enforces approved authorizations for access to the data in accordance with an applicable policy, and establishes the source of access to the data. Another control can include an access control for mobile devices, which identifies whether a mobile device is permitted to access the data. Another control can include an authenticator management control, which manages user authenticators such as passwords, tokens, biometrics, PKI certificates, and key cards, for example, verifying the identity of a user or device receiving an authenticator, establishing procedures for authenticator distribution, etc. Details of other security controls are described in, but not limited to, NIST Special Publication SP800-53, incorporated by reference above.

In an embodiment, the security controls are defined and controlled by a business actor, for example, a business owner, which is responsible for defining the security aspects related to defining data attributes not normally specified by security. For example, this might include business marking information leading up to a marketing cycle for seasonal sales in a store. In this example, business marking or defining the data classification can cover the risk and sensitivity taken to protect or not a message as it lives on the network. Marking it provides a level of data classification and how to respond or respect the message as a recipient. Prior to the marketing release, the data is company confidential and should have only limited access by a select few. After the release, the data becomes historical and may not be well served to keep, the business will have to weigh on when the data can be relinquished and destroyed.

Business security controls can be defined according to the Open Security Architecture organizations defined categories based on the National Institute of Standards and Technology (NIST) for security management under NIST Special Publication SP800-53 documented guidelines, incorporated herein by reference in their entirety. A business security control can include an automated marking control, which includes control data regarding what is owned, where it is used, and includes end-of-life marking. For example, markings can be employed on external media, e.g., hardcopy documents output from the information system. Another business security control can include an automated labeling control, which includes label information as to whether the data is "in storage," "in process," and "in transit" or other category or classification of the data. Another business security control can identify specific user actions that can be performed on the information system without identification or authentication, and documents and provides supporting rationale in the security plan for the information system, user actions not requiring identification and authentication. This control is intended for those specific instances where an organization determines that no identification and authentication is required. Details of other business security controls are described in, but not limited to, NIST Special Publication SP800-53, incorporated by reference above.

Figure 7:
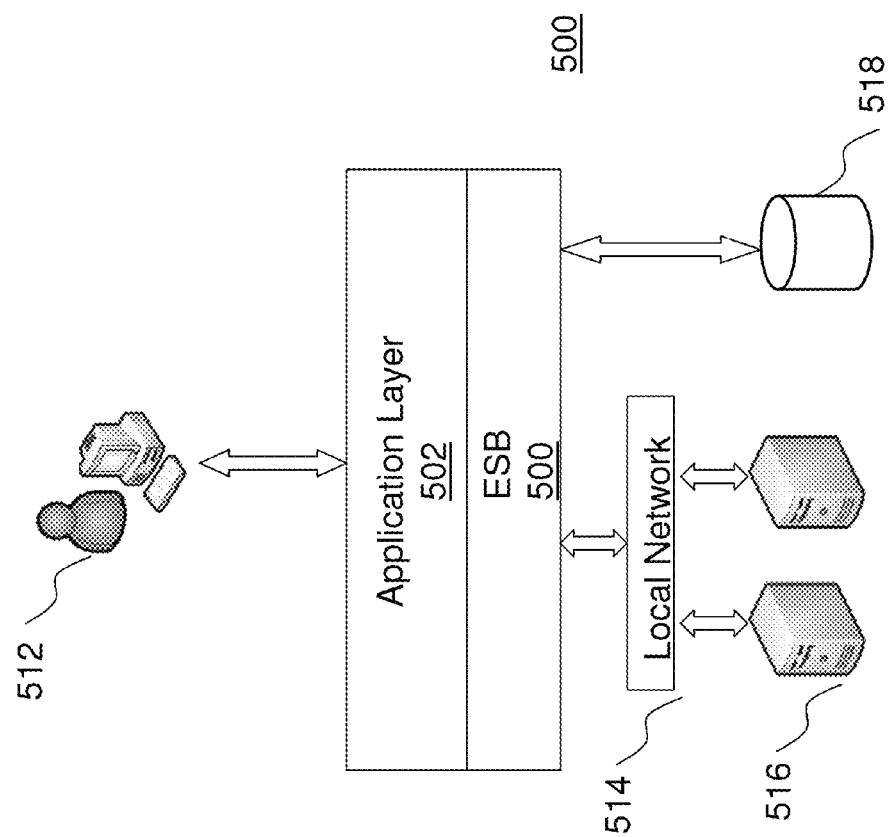
FIG. 7 is a diagram of an enterprise service bus (ESB), in accordance with an embodiment.

FIG. 7 is a diagram of an enterprise service bus (ESB) 500, in accordance with an embodiment. The ESB 500 determines who or where is allowed to flow to, or what and who, for example, what applications, are allowed to view, edit or alter the data. The ESB 500 is a system that controls which message is sent to where and how best to send it, for example, via electronic mail, EDI, fax, wireless SMS message, etc. The ESB 500 is positioned between an application layer 502 and one or more devices that perform a transfer and/or storage of data of the augmented/encapsulated data described herein. The ESB 500 is constructed and arranged to allow the applications and services of the application layer 502 to operate independently of the protections on the data and their associated storage. The ESB 500 acts as a broker for the sending device, such as the computer 12-1 described herein, and can decide based on the controls provided with a unit of data received from the sending device how to transmit the data, how to allow access the data contents, where storage is permitted, and when the stored message is allowed to be deleted, purged, etc.

The ESB 500 includes a service bus, which can include a set of service modules that communicate with the applications at the application layer 502. For example, the backend of the ESB 500 can include a storage device 518 such as a database but being handled as a request sent from a web-service front-end web application. Datacentric services require the interface, capture, expansion of data, encryption, decryption, tokenization, and format exchange to and from each respective originator and required to the intended recipient. If authorized, the recipient of the data can be served the data and presented to the web services. As described herein, the ESB 500 is the "middle-man" or broker to the data broker 104 that can either set up sending information or serve as a broker to setup services and application controls to allow the endpoint to do what is required in order to fulfill delivery.

For example, an application at the computer 512 can process data that is output from the computer 512. The data broker 104 at that computer 512 can build a package of controls, destination information, encryption and/or tokenization information, or a combination thereof from local services executing on the computer 512, which is in communication with the local network 514. The ESB 500 can determine the services necessary for the data broker, for example, related to encryption, unpacking of data, RBAC rules regarding the forwarding of data, and so on. A data broker at the recipient device can unpack controls related to local services, process the controls for the local services on the local computer, etc. An application at the recipient device can receive instructions from the data broker in accordance with the requirements provided by the originating user at the computer 512.

The information provided with the security pattern 200 is required for self-protecting the data. The self-protecting message contains information that might contain sensitive information or may have only limited useful life, for example, a Sunday newspaper flyer advertisement. Using the self-protecting message format provides assurance that it goes to the right destination for the reasons intended, and protects the integrity of the message in a non-repudiating manner. The data can correspond to self-protecting entities, such as the sender, receiver, or systems that process the message composed of a self-protection, and is capable of identifying the basic characteristics of structure and with tokenization as security, and becomes alive. For example, the self-protecting data does not reveal its contents but is nevertheless free to roam across network boundaries such as the local network 514.

As described above, when encapsulating data in a self-protecting format, the data of unit can be prepared for use at an application in communication with the application layer 502. Here, an end-point receiver may be a receiving computer 12-2, a storage device 38, or other electronic device. In doing so, the originator, e.g., computer 12-1, must be informed where the information is to be directed in order to establish the controls. Once defined, the data or information may require protections, for example, regulatory requirements such as HIPAA or PCI, that determine the originator 12-1 to encrypt or tokenize the data. The receiving device can reverse the process to ensure that the data is processed accordingly.

The self-protecting message can include controls that determine a sensitivity of classification or a means of distribution, or govern controls for storage. The ESB 500 can determine the destination(s) of the data, determine authorized entities allowed to receive the data, and/or establish the manner in which the message is allowed to be processed by the receiving device(s). If stored at the storage device 518, the ESB 500 can periodically check stored messages for an EOL time, and then schedule a purging of messages that exceed the EOL indicator.

Many conventional systems include structured data that can be stored in databases or the like. However, unstructured data may also be created from internal and external blogging sites, websites with free-format text, and collaboration site having a server 516, for example, a SharePoint™ server. The movement from non-protected or controlled through security appliances or applications to self-protecting data can be performed in phases, including a data identification phase, a data formation and classification phase, a data convergence phase, and a data release phase. The last cycles of the data release phase can incorporate a meta-application interface between the applications 502 and storage 518. As data is converted from one type to the other, fewer external controls are required. However, it is left to the discretion of the business to keep or remove the additional controls.

The benefits are simply more secure data capable of being comingled or at least contained in memory storage without necessitating additional security controls and adding expense to the data storage and to the business. Also, the data storage device 518 can be self-regulating. For example, when data is at rest, for example, stored at the storage device 518, the security pattern 200 having controls defining data characteristics and the like can be accessed, for example, during a query. The stored data can be modified, deleted, moved, or the like according to the controls. In this manner, the data need not be stored in the data storage device 518 indefinitely, for example, it can be expunged according to a time period provided in the EOL field 212.

Figure 8:
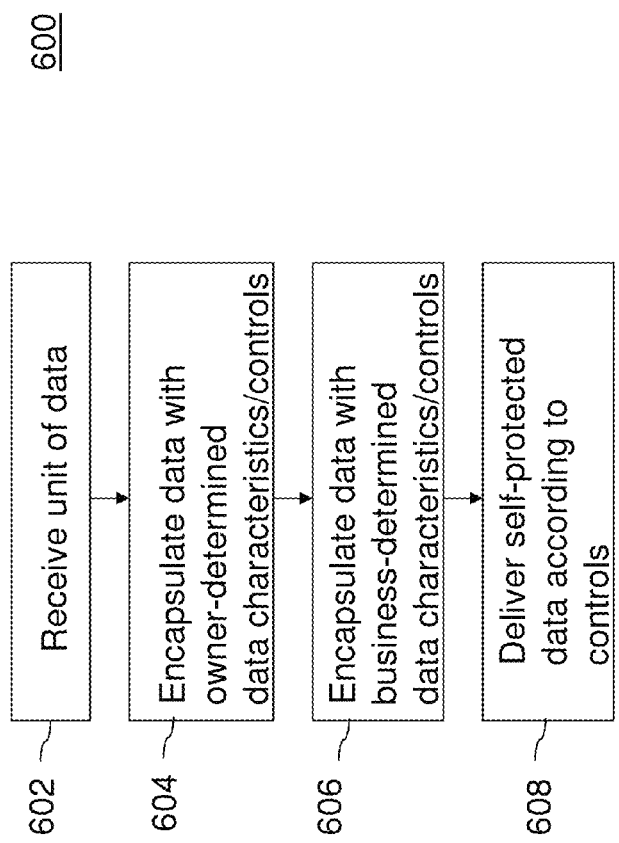
FIG. 8 is a flowchart of a method for protecting data, in accordance with an embodiment.

FIG. 8 is a flowchart of a method 600 for protecting data, in accordance with an embodiment. The method 600 can be applied to the networks illustrated at FIG. 1 and/or FIG. 3, respectively. Reference is therefore made to elements of FIGS. 1-7.

At block 602, a unit data is received by the data protection system 100. The data can be part of an unencrypted electronic document, message, or the like. The data can include structured data, for example, structured query language (SQL) or extensible markup language (XML) data. Alternatively, the data can include unstructured data.

At block 604, the unit data is encapsulated with a set of owner-determined data characteristics/controls, for example, described herein At block 606, the unit data is encapsulated with a set of business-determined data characteristics/controls, for example, described herein.

At block 608, the self-protected data is delivered according to the controls provided at blocks 604 and 606. The ESB 500 inspects the message header or the security controls and determines the range of allowed rights to receive it, where it is allowed delivered, the methods of protection (encryptions, tokenization, etc.), and when data is stored, how long to keep in storage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method for protecting data in an electronic communications environment, comprising:

establishing, by an interested entity, one or more controls for a received unit of data;

encapsulating, at an application layer of a source device in the electronic communications network, the unit of data with self-protection security data that includes the one or more controls, wherein encapsulating the unit of data with the self-protection security data comprises:
defining an ownership of the data;
defining modification parameters of the data;
defining a data classification; and
defining a role-based access;

delivering the encapsulated unit of data from the source device to an application layer of a destination device in the electronic communications network; and facilitating, by a data broker, the delivery of the data to the application layer of the destination device according to the controls in the application layer in the source device, wherein facilitating the delivery of the data includes:
identifying for the receiving device a collection of services corresponding to the controls, the controls of the self-protection security data delivered from the application layer of the source device to the application layer of the destination device independently of a communication path of the network.

2. The method of claim 1, wherein the interested entity provides security controls of the one or more controls.

3. The method of claim 2, wherein the security controls provide attributes for the unit of data when stored or in transport.

4. The method of claim 2, wherein the security controls are constructed and arranged to authenticate a user in communication with the receiving device.

5. The method of claim 1, wherein the interested entity is a business entity responsible for business rules of conduct and further responsible for ensuring that attributes of the unit of data comply with the business rules of conduct in the electronic communications network.

6. The method of claim 5, wherein the one or more controls includes an end-of-life (EOL) of the unit of data established by the business entity.

7. The method of claim 1, further comprising storing the encapsulated unit of data at a storage device according to the one or more controls of the self-protection security data.

8. The method of claim 1, wherein encapsulating the unit of data with self-protection security data includes preparing the unit of data for use at an application.

9. The method of claim 1, further comprising:
defining an end-of-life of the data.

10. A data protection system, comprising:
a computer including a data packet generator that encapsulates at an application layer of a source device a unit of data with a set of self-protection data that includes one or more controls, wherein the self-protection security data includes a role-based access field, an ownership field, a data classification field, and a modification parameters field;
a computer that delivers the encapsulated unit of data from the source device to an application layer of a destination device in the electronic communications network;
a computer including a data broker that facilitates the delivery of the data to an application layer of a destination device in a network according to the controls in the application layer of the source device, which includes identifying for the receiving device a collection of services corresponding to the controls, the controls of the self-protection security data delivered from the application of the source device to the application layer of the destination device independently of a communication path of the network.

11. The data protection system of claim 10, wherein the one or more controls includes security controls.

12. The data protection system of claim 11, wherein the security controls provide attributes for the unit of data when stored or in transport.

13. The data protection system of claim 11, wherein the security controls are constructed and arranged to authenticate a user in communication with the receiving device.

14. The data protection system of claim 10, wherein the one or more controls include business controls constructed and arranged to ensure that attributes of the unit of data comply with business rules of conduct in the network.

15. The data protection system of claim 14, wherein the business controls include an end-of-life (EOL) of the unit of data.

16. The data protection system of claim 10, wherein the RBAC field is populated with data defining a role-based access corresponding to payload field data, wherein the ownership field is populated with data defining an ownership of the payload field data, wherein the classification field is populated with data defining a classification of the payload field data, and wherein the modification rules field is populated with data defining modification parameters of the payload field data.

17. A computer program product for protecting data in an electronic communications environment, the computer program product comprising:

a non-transitory computer readable storage medium having computer readable program code embodied therewith, the computer readable program code comprising:
  computer readable program code configured to establish one or more controls for a received unit of data;
  computer readable program code configured to encapsulate at an application layer of the unit of data with self-protection security data that includes the one or more controls wherein encapsulating the unit of data with the self-protection security data comprises:
    defining an ownership of the data;
    defining modification parameters of the data;
    defining a data classification; and
    defining a role-based access;
  computer readable program code configured to deliver the encapsulated unit of data from the source device to an application layer of a destination device in the electronic communications network; and
  computer readable program code configured to facilitate the delivery of the data to the application layer of the destination device according to the controls in the application layer in the source device, including identifying for the receiving device a collection of services corresponding to the controls, the controls of the self-protection security data delivered from the application layer of the source device to the application layer of the destination device independently of a communication path of the network.

* * * * *